June 5, 1951     E. F. DRUILHET     2,555,436
MOTOR VEHICLE BUMPER DEVICE
Filed July 29, 1947     2 Sheets-Sheet 1
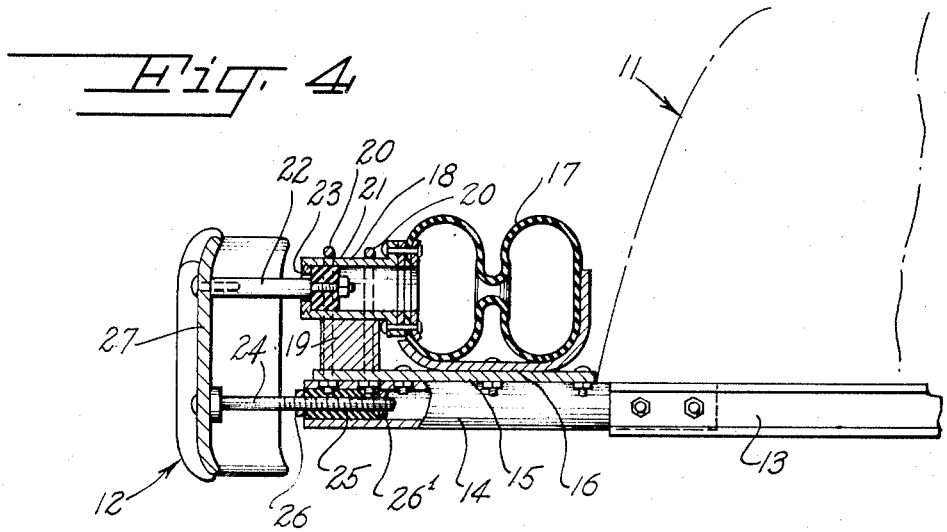
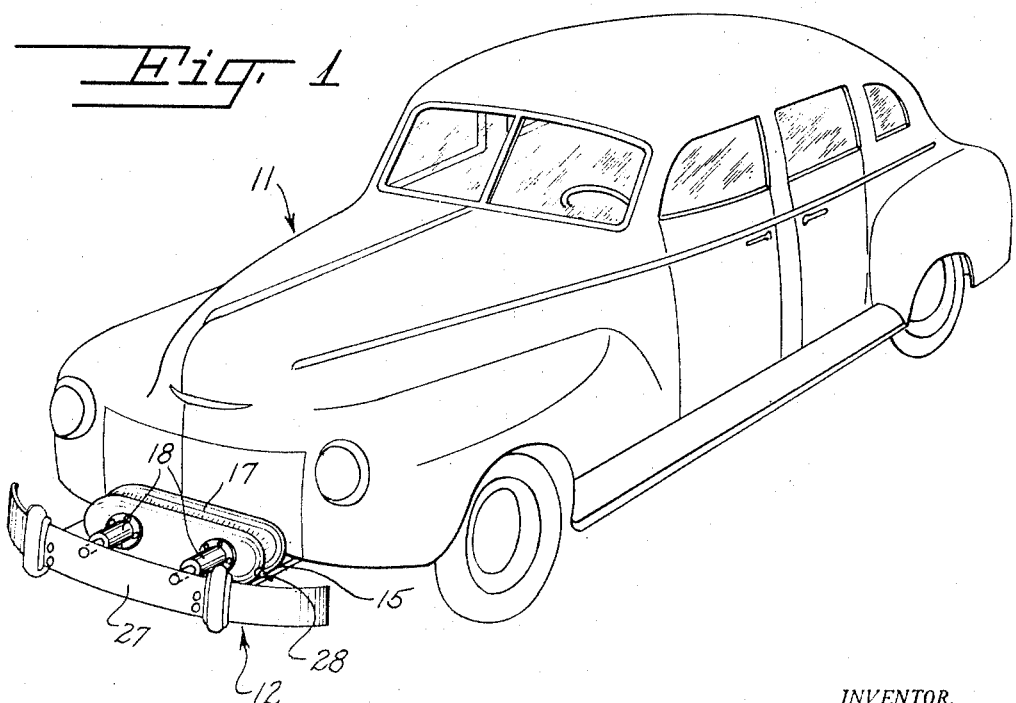
INVENTOR.
Ernest F. Druilhet
BY
McMorrow, Berman & Davidson
Attorneys June 5, 1951          E. F. DRUILHET          2,555,436
MOTOR VEHICLE BUMPER DEVICE
Filed July 29, 1947          2 Sheets-Sheet 2
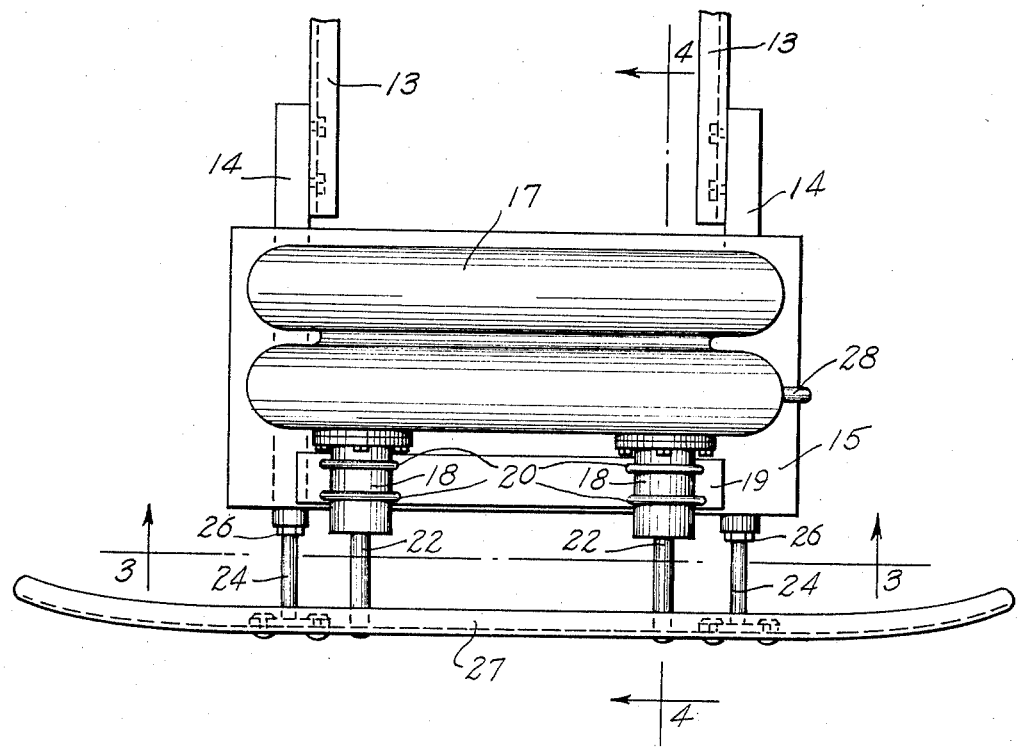
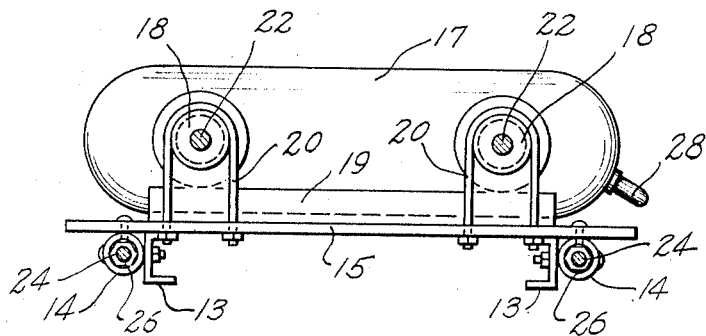
INVENTOR.
Ernest F. Druilhet
BY
McMorrow, Berman & Davidson
Attorneys Patented June 5, 1951

2,555,436

UNITED STATES PATENT OFFICE 2,555,436

MOTOR VEHICLE BUMPER DEVICE

Ernest F. Druilhet, Port Huron, Mich.

Application July 29, 1947, Serial No. 764,336

3 Claims. (Cl. 293—85)

This invention relates to collision absorbing devices for motor vehicles, and more particularly to automobile bumpers.

A main object of the invention is to provide a novel and improved bumper device for motor vehicles which is very simple in construction, compact in size, and is very efficient in its shock absorbing action.

A further object of the invention is to provide an improved bumper device for motor vehicles which is very rugged in construction, smooth in action and which is adapted to efficiently absorb very severe collision shocks, thereby preventing damage to the vehicle on which it is mounted.

Further objects and advantages of the invention will become apparent from the following description and claims, and from the accompanying drawings, wherein:

Figure 1 is a perspective view of an automobile equipped with a front bumper constructed in accordance with the present invention.

Figure 2 is an enlarged top plan view of the bumper structure employed in the automobile of Figure 1.

Figure 3 is a cross-sectional view taken on line 3—3 of Figure 2.

Figure 4 is a cross-sectional view taken on line 4—4 of Figure 2.

Referring to the drawings, 11 designates a motor vehicle having secured to its front end a bumper structure generally designated at 12. Designated at 13, 13 are the forward ends of the longitudinal beams of the vehicle frame. Secured rigidly to said forward beam ends are forwardly extending parallel tubular members 14, 14. Secured transversely on the tubular members 14, 14 is a horizontal plate member 15. Secured to plate member 15 and extending transversely with respect to the tubular supports 14, 14 is a channel-shaped member 16 in which is positioned an elongated inflated double-chambered bellows 17 of heavy rubber or other suitable resilient material. As shown in Figure 4, the bellows 17 include a pair of chambers arranged in side-by-side relation and in communication with each other. Secured to the front chamber of bellows 17 and communicating therewith are rigid forwardly extending cylinders 18, 18. Cylinders 18, 18 are supported on a transverse spacer block 19 interposed between the cylinders and plate member 15 and are respectively rigidly clamped to said plate member by U-bolts 20, 20 which also pass through said spacer block 19.

Each cylinder 18 contains a closely fitting rubber piston 21 to which is axially secured a forwardly projecting rod member 22. An apertured plug 23 is threaded into the forward end of each cylinder to prevent withdrawal of the piston 21 therein. The forward ends of the rod members 22, 22 are secured to a bowed transverse metal bumper bar 27. Bumper bar 27 is secured to the tubular members 14, 14 by rods 24, 24 which are rigidly connected to said bumper bar and which carry deformable sleeves 25 on their end portions, said sleeves being frictionally engaged inside the tubular members 14 and tightly secured therein by the expansion produced by compression exerted on said sleeves by pressure nuts 26, 26' threaded on the rods at the respective ends of the deformable sleeves. The sleeves 25, 25 may be of rubber or other readily deformable resilient material. When each outer nut 26 is jammed tightly against the outer end of its associated deformable sleeve 25 the rod 24 associated therewith is made substantially rigid with respect to its associated tubular member 14, but the connection will yield if a very heavy shock is experienced at bumper bar 27.

In operation, when a severe collision occurs, the brunt of the shock is absorbed in overcoming the frictional resistance of the sleeves 25, 25 in the tubular members 14, 14. When this resistance has been overcome, the bumper bar 27 moves rearwardly, whereby rod members 22, 22 move their pistons 21 inwardly in the cylinders 18, 18. This builds up the pressure inside the dual chambers of bellows 17, causing said chambers to resist further expansion and to exert a cushioning back pressure on the pistons 21. The unspent force of the collision shock is thus cushioned by the pressure developed in the bellows 17, so that damage to the vehicle is prevented.

After a severe collision shock as above described, the friction sleeves 25 may be readjusted in the tubular members 14, 14 by loosening the outer pressure nuts 26, restoring the rod members 24 to normal positions with respect to the tubular members 14, 14 and then again tightening said outer pressure nuts 26.

As shown in Figures 1, 2 and 3, bellows 17 is provided with an air intake valve 28, similar to the air intake valve of a tire tube, for inflating the bellows to a predetermined optimum normal air pressure in the same manner as an automobile tire is inflated. The shock absorbing action of the bellows is produced by the resistance thereof to a further increase in air pressure by the pistons 21.

As an alternative, the sleeves 25, 25 may be threaded into the tubular members 14, 14 instead of being frictionally engaged therein. When a very heavy shock is experienced at bumper bar 27 the threads in the sleeves 25, 25 will spread and flatten, allowing the rods 24, 24 to move rearwardly.

Although the above described structure has been illustrated with reference to a front bumper, it will be readily understood that the same structure can be employed at the rear of the vehicle for the rear bumper thereof within the spirit of the present invention.

While a specific embodiment of a shock absorbing bumper structure for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A shock absorber device for a vehicle comprising a pair of horizontally-disposed tubular members projecting from an end of the vehicle frame and secured to the latter, said members being arranged in parallel spaced relation with respect to each other and positioned in the same horizontal plane, a rod in each of said tubular members and projecting out of the latter, the portion of the rod in each tubular member being provided with an axially compressed element of resilient deformable material frictionally engaging the wall of said member, said last named elements providing a very high resistance to axial displacement of the rods, a horizontally-disposed bumper bar arranged in alignment with the projecting ends of said rods and fixedly secured to the latter ends, a horizontally-disposed bellows arranged transversely of said tubular members and supported by the latter, a pair of horizontally-disposed hollow cylinders projecting from the front face of said bellows and secured to the latter, said cylinders being arranged in spaced relation with respect to each other and positioned above said tubular members, a piston in each of said cylinders and mounted for slidable movement therein, and a rod member having one end connected to each of said pistons and having the other end secured to said bumper bar, whereby inward movement of said bumper bar responsive to a shock increases the pressure in said bellows, said increase of pressure providing a cushioning resistance subsequent to the yielding of the axially compressed elements under heavy shock force on the bumper bar.

2. A shock absorber device for a vehicle comprising a pair of horizontally-disposed tubular members projecting from an end of the vehicle frame and secured to the latter, said members being arranged in parallel spaced relation with respect to each other and positioned in the same horizontal plane, a rod in each of said tubular members and projecting out of the latter, the portion of the rod in each tubular member having a sleeve of resilient deformable material mounted therein frictionally engaging the wall of said member, means on the portion of the rod in each tubular member engaging the opposite ends of said sleeve and exerting axial compression thereon, a horizontally-disposed bumper bar arranged in alignment with the projecting ends of said rods and fixedly secured to the latter ends, a horizontally-disposed bellows arranged transversely of said tubular members and supported by the latter, said bellows including a pair of chambers arranged in side-by-side relation and in communication with each other, a pair of horizontally-disposed hollow cylinders projecting from the front face of said bellows and secured to the latter, said cylinders being arranged in spaced relation with respect to each other and positioned above said tubular members, a piston in each of said cylinders and mounted for slidable movement therein, and a rod member having one end connected to each of said pistons and having the other end secured to said bumper bar, whereby inward movement of said bumper bar responsive to a shock increases the pressure in said bellows, said increase in pressure providing a cushioning resistance subsequent to the yielding of the sleeves under heavy shock force on the bumper bar.

3. A shock absorber device for a vehicle comprising a horizontally disposed tubular member projecting from an end of the vehicle frame and secured to the latter, a rod in said tubular member projecting out of the latter, the portion of the rod inside the tubular member being provided with an axially compressed element of resilient deformable material frictionally engaging the wall of said member, said last named element providing a very high resistance to axial displacement of the rod, a horizontally disposed bumper bar arranged in alignment with the projecting end of said rod and fixedly secured to the latter end, a horizontally disposed bellows arranged transversely of said tubular member and supported by the latter, a horizontally disposed hollow cylinder projecting from the front face of said bellows and secured to the latter, said cylinder being parallel to said tubular member, a piston in said cylinder mounted for slidable movement therein, and a rod member having one end connected to said piston and having the other end secured to said bumper bar, whereby inward movement of said bumper bar responsive to a shock increases the pressure in said bellows, said increase of pressure providing a cushioning resistance subsequent to the yielding of the axially compressed element under heavy shock force on the bumper bar.

ERNEST F. DRUILHET.

REFERENCES CITED

The following references are of record in the file of this patent:

UNITED STATES PATENTS

| Number | Name | Date |
|---|---|---|
| 1,373,822 | Kleine | Apr. 5, 1921 |
| 1,810,717 | Lord | June 16, 1931 |
| 1,825,086 | Ohlendorf | Sept. 29, 1931 |
| 1,861,691 | Gabel | June 7, 1932 |
| 2,090,659 | Zirmer et al. | Aug. 24, 1937 |
| 2,139,666 | Bogart | Dec. 13, 1938 |
| 2,144,357 | Booharin | Jan. 17, 1939 |